(12) United States Patent
Rhee et al.

(10) Patent No.: US 8,726,613 B2
(45) Date of Patent: May 20, 2014

(54) COMPOSITE HONEYCOMB SANDWICH PANEL EQUIPPED WITH COMPOSITE-RAIL ALUMINUM I-SHAPE SIDE INSERT

(75) Inventors: Ju Hun Rhee, Daejeon (KR); Hee Keun Cho, Gyeonggi-do (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 13/814,581

(22) PCT Filed: Aug. 9, 2011

(86) PCT No.: PCT/KR2011/005779
§ 371 (c)(1),
(2), (4) Date: Feb. 6, 2013

(87) PCT Pub. No.: WO2012/020959
PCT Pub. Date: Feb. 16, 2012

(65) Prior Publication Data
US 2013/0136888 A1 May 30, 2013

(30) Foreign Application Priority Data
Aug. 10, 2010 (KR) .................. 10-2010-0076778

(51) Int. Cl.
*E04C 2/00* (2006.01)

(52) U.S. Cl.
USPC ........ 52/797.1; 52/787.1; 52/793.1; 52/800.1

(58) Field of Classification Search
USPC ........ 52/783.17, 787.1, 793.1, 796.12, 797.1, 52/798.1, 800.1, 802.1, 588.1
See application file for complete search history.

(56) References Cited

U.S. PATENT DOCUMENTS

| | | | | |
|---|---|---|---|---|
| 4,557,961 A | * | 12/1985 | Gorges | .......................... 428/117 |
| 4,931,340 A | * | 6/1990 | Baba et al. | ...................... 428/73 |
| 5,353,502 A | | 10/1994 | Hattori et al. | |

(Continued)

FOREIGN PATENT DOCUMENTS

| | | |
|---|---|---|
| JP | 08-303129 A | 11/1996 |
| JP | 2001-038832 A | 2/2001 |
| KR | 20-1994-0026917 U | 12/1994 |
| KR | 20-0422701 Y1 | 8/2006 |

*Primary Examiner* — Brian Glessner
*Assistant Examiner* — Brian D Mattei
(74) *Attorney, Agent, or Firm* — Rabin & Berdo, P.C.

(57) ABSTRACT

The present invention relates to a composite honeycomb sandwich panel equipped with a composite rail aluminum I-shaped side insert, and more specifically, to an improved structure of a hybrid composite sandwich panel having a laminated composite skin and an aluminum honeycomb core which is mechanically improved in terms of assembly, strength and weight. The composite honeycomb sandwich panel includes: a planar honeycomb core; a composite rail which is wrapped around the periphery of the honeycomb core and has therein a hollow space that is open on opposite sides thereof; an I-shaped center rail insert which is fitted into the hollow space of the composite rail so that the sandwich panel is connected to an adjacent sandwich panel by bolting through the I-shaped center rail insert; and laminated composite skins which cover upper and lower surfaces of the honeycomb core having the composite rail wrapped around.

17 Claims, 6 Drawing Sheets

(56) References Cited

U.S. PATENT DOCUMENTS

| | | | |
|---|---|---|---|
| 5,480,729 A | | 1/1996 | Hattori et al. |
| 5,483,778 A | * | 1/1996 | Scrivener ................... 52/579 |
| 6,061,993 A | * | 5/2000 | Bendixen et al. ........ 52/783.19 |
| 7,143,564 B2 | * | 12/2006 | Renck .................. 52/783.17 |
| 2002/0108323 A1 | * | 8/2002 | Gruber ........................ 52/177 |
| 2004/0093828 A1 | * | 5/2004 | Smith et al. ................ 52/793.1 |
| 2006/0000186 A1 | * | 1/2006 | Carlson et al. ............ 52/793.1 |
| 2006/0076351 A1 | * | 4/2006 | King et al. ................. 220/218 |
| 2006/0137294 A1 | * | 6/2006 | Waits, Jr. et al. ......... 52/787.1 |
| 2009/0211499 A1 | * | 8/2009 | Clark et al. ................. 108/129 |

* cited by examiner

FIG. 6

COMPOSITE HONEYCOMB SANDWICH PANEL EQUIPPED WITH COMPOSITE-RAIL ALUMINUM I-SHAPE SIDE INSERT

TECHNICAL FIELD

The present invention relates, in general, to a composite honeycomb sandwich panel equipped with a composite rail aluminum I-shaped side insert and, more particularly, to an improved structure of a hybrid composite sandwich panel having a laminated composite skin and an aluminum honeycomb core which is mechanically improved in terms of assembly, strength and weight.

BACKGROUND ART

Generally, conventional composite sandwich panels require ribs (L- or U-shaped) to join them with each other and construct a structure. However, such a technique using ribs increases the weight of a constructed structure, makes the construction thereof complex, and makes it impossible to form a planar junction surface because the ribs protrude outwards from the sandwich panel. Furthermore, the coefficient of thermal expansion of ribs which are typically made of aluminum is different from that of the composite sandwich panel. This causes deformation of the structure depending on variation of the environmental temperature.

Moreover, in the case of structures which are used for high-precision aerospace structures such as satellite structures, the deformability thereof with respect to variation of the environmental temperature must be very low, and it must meet requirements such as high strength relative to the weight, high space efficiency of a structure and sufficient durability. However, the conventional composite sandwich panels cannot meet these requirements.

DISCLOSURE

Technical Problem

Accordingly, the present invention has been made keeping in mind the above problems occurring in the prior art, and an object of the present invention is to provide a composite sandwich panel which is configured such that composite sandwich panels can be joined with each other in the most efficient manner, and which has design advantages such as a reduction of thermal deformation, increased strength, enhanced durability and increased space efficiency.

Technical Solution

In order to accomplish the above object, the present invention provides a composite honeycomb sandwich panel, including: a planar honeycomb core (10); a composite rail (20) wrapped around a periphery of the honeycomb core (20), the composite rail (20) having therein a hollow space (21) that is open on opposite sides thereof; an I-shaped center rail insert (30) fitted into the hollow space (21) of the composite rail (20) so that the sandwich panel (100) is connected to an adjacent sandwich panel (100) by bolting through the I-shaped center rail insert (30); and laminated composite skins (40) covering upper and lower surfaces of the honeycomb core (10) having the composite rail (20) wrapped around.

The composite rail (20) may include: an upper rail (22) and a lower rail (23) provided parallel to each other at positions spaced apart from each other by a predetermined distance; and spacers (24) provided between opposite ends of the upper and lower rails (22) and (23).

The composite honeycomb sandwich panel may further include a U-shaped side rail insert (50) fitted into each of opposite ends of the hollow space (21) so that the sandwich panel (100) is connected to the adjacent sandwich panel (100) by bolting through the U-shaped side rail insert (50).

Furthermore, I-shaped center rail insert (30) may include: a web (31) placed upright; and flanges (32) protruding from respective opposite ends of the web (31) outwards in opposite directions, wherein a bolt hole (33) is formed in a central portion of the web (31).

The U-shaped side rail insert (50) may include: a web (51) placed upright; and flanges (52) protruding from opposite ends of the web (51) outwards in one direction, wherein a bolt hole (53) is formed in a central portion of the web (51).

In addition, an adhesive film (60) may be interposed between the honeycomb core (10) having the composite rail (20) wrapped around and each of the laminated composite skins (40) to bond the laminated composite skin (40) to the honeycomb core (10).

The center rail insert (30) or the side rail insert (50) may be attached in the hollow space (21) of the composite rail (20) by an epoxy adhesive.

The honeycomb core (10), the center rail insert (30) and the side rail insert (50) may be made of aluminum.

Advantageous Effects

The present invention has the following advantages.

First, the present invention provides improved structure and construction of a sandwich panel having composite skins and makes it possible to enhance mechanical efficiency of the panel. Typically, to construct a structure using panels, it is essential to join the panels with each other. The conventional technique uses separate ribs to join the panels with each other, but the present invention does not require such separate ribs. That is, in the present invention, I-shaped aluminum inserts are installed in a composite rail which is wrapped around the sandwich panel. Therefore, the composite rail can increase the strength of the sandwich panel. Because the separate ribs are not required, there are advantages of a simple structure and increased space efficiency.

Second, the present invention can provide a sandwich panel which is very stable to variation in temperature. In detail, the coefficient of thermal expansion of the composite skins is the same as that of the composite rail, so structural deformation which may result from a difference in coefficient of thermal expansion can be prevented. Although the I-shaped inserts are made of aluminum, the coefficient of thermal expansion of which is higher than that of typical composite material, a contact area between the I-shaped inserts and the sandwich panel is very small compared to the entire area of the sandwich panel. Therefore, influence of structural deformation can be minimized.

Third, when sandwich panels are joined with each other, different kinds of forces such as contact pressure and torsion are generally applied to junction surfaces between the panels. In the present invention, such forces are governed by the composite rail which has very high mechanical strength. Thus, the present invention can provide the sandwich panel which is structurally very strong and has a stable structure.

BEST MODE

Hereinafter, a preferred embodiment of the present invention will be described in detail with reference to the attached drawings. The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Therefore, the construction of the embodiment illustrated in the specification and the drawings must be regarded as only one illustrative example, and these are not intended to limit the present invention. Furthermore, it must be understood that various modifications, additions and substitutions are possible at the point of time of application of the present invention.

Figure 1:
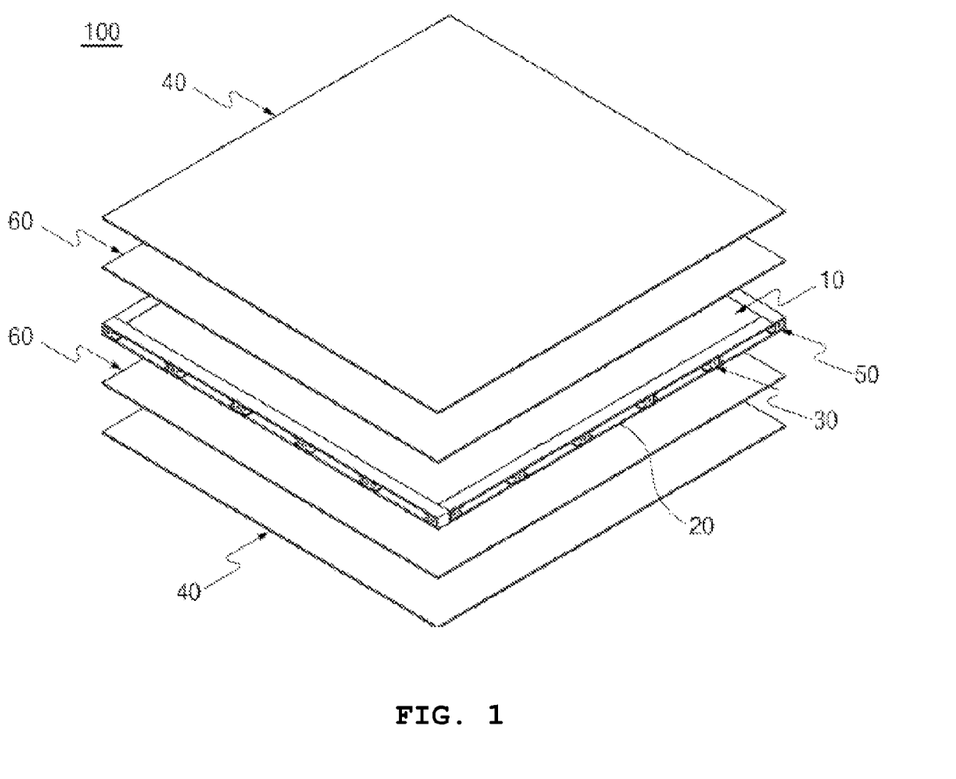
FIG. 1 is an exploded perspective view illustrating a composite honeycomb sandwich panel, according to the present invention.

FIG. 1 is an exploded perspective view illustrating a composite honeycomb sandwich panel, according to the present invention.

As shown in FIG. 1, the composite honeycomb sandwich panel according to the present invention includes a planar honeycomb core 10, composite rails 20, I-shaped center rail inserts 30 and planar laminated composite skins 40. Here, the composite honeycomb sandwich panel may further include U-shaped side rail inserts 50 which are fitted into each composite rail 20, and adhesive films 60 each of which bonds the corresponding laminated composite skin 40 to the honeycomb core 10 and the composite rails 20.

Figure 5:
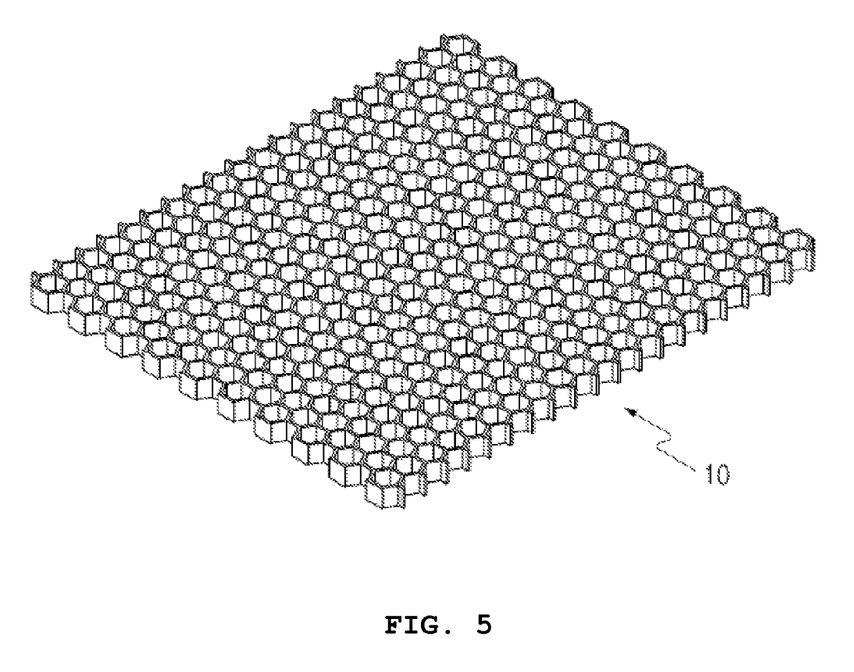
FIG. 5 is a perspective view of a honeycomb core used in the present invention.

The honeycomb core 10 has a planar shape and is a member which has a honeycomb structure with many holes to reduce the weight of the panel while maintaining the strength thereof. FIG. 5 is a perspective view of the honeycomb core used in the present invention. The honeycomb core 10 is preferably made of aluminum.

The composite rails 20 enclose a periphery of the honeycomb core 10. Each composite rail 20 has therein a hollow space 21 which is open on opposite sides thereof. The composite rails 20 function not only to finish the periphery of the honeycomb core 10 but also make it possible for the sandwich panel 100 to be connected to an adjacent sandwich panel 100. That is, the rail inserts 30 and 50 which will be explained later herein are fitted into and fixed in the hollow space 21 so as to make it possible for the sandwich panel 100 to be connected to another sandwich panel 100 by bolting.

Figure 2:
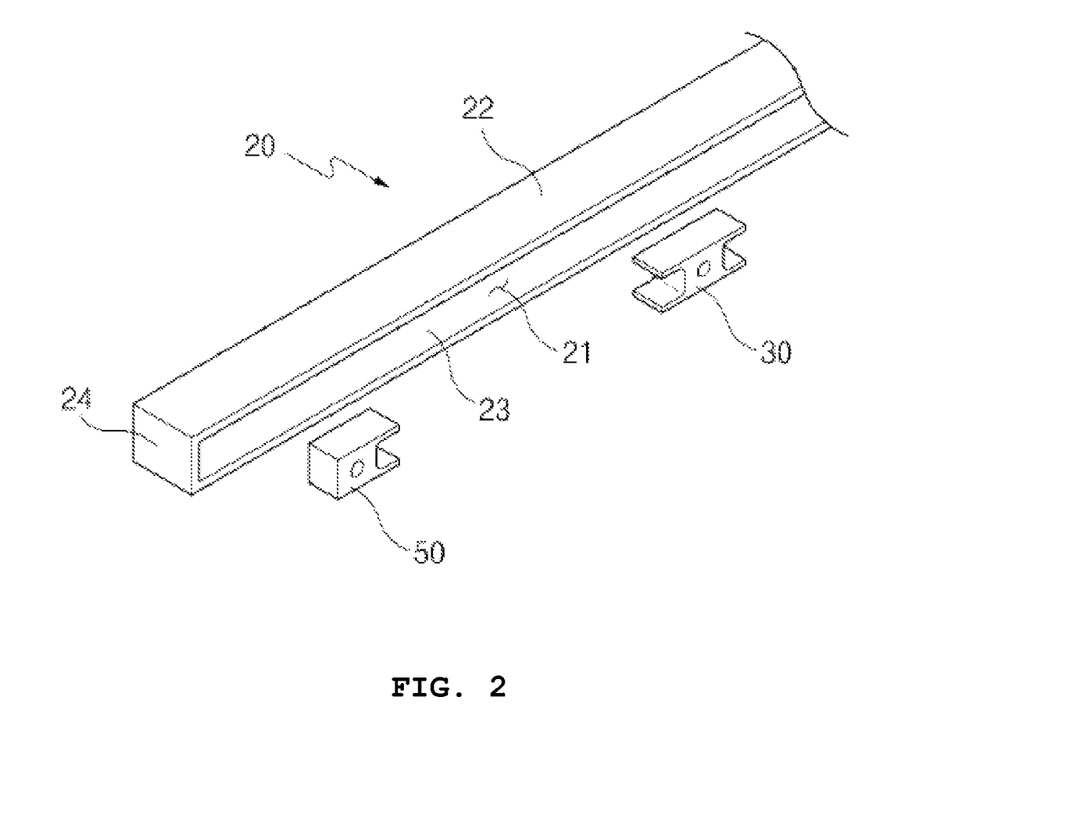
FIG. 2 a perspective view illustrating a composite rail and rail inserts used in the present invention.

FIG. 2 a perspective view illustrating the composite rail and the rail inserts used in the present invention. As shown in FIG. 2, the composite rail 20 includes an upper rail 22 and a lower rail 23 which are spaced apart from each other by a predetermined distance and are provided parallel to each other, and spacers 24 which are provided between opposite ends of the upper and lower rails 22 and 23. Preferably, a thickness of the composite rail 20 is the same as that of the honeycomb core 10. Further, it is preferable that the distance between the upper rail 22 and the lower rail 23 be the same as the height of the rail inserts 30 and 50 which will be explained later.

The I-shaped center rail insert 30 is fitted into the hollow space 21 of the composite rail 20 and is connected to an adjacent sandwich panel 100 by bolting.

Figure 3:
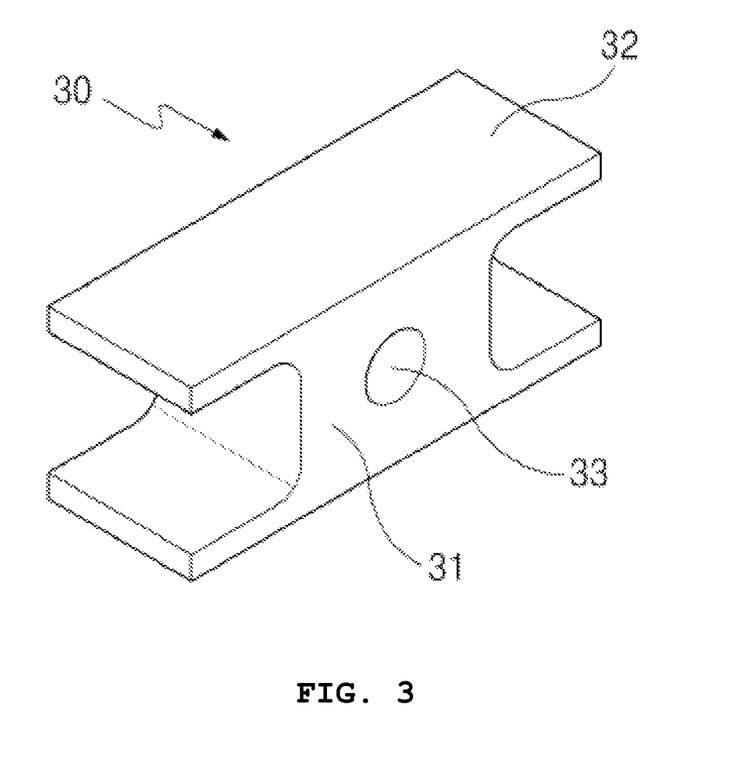
FIG. 3 is a perspective view of a center rail insert used in the present invention.

FIG. 3 is a perspective view of the center rail insert used in the present invention. As shown in FIG. 3, the I-shaped center rail insert 30 includes a web 31 which is placed upright, and flanges 32 which protrude from the respective opposite ends of the web 31 outwards in opposite directions. A bolt hole 33 is formed in a central portion of the web 31 so that the I-shaped center rail insert 30 can be coupled to an adjacent sandwich panel through the bolt hole 33 by bolting.

Due to the construction of the web 31 and the flanges 32, the center rail insert 30 generally has an I shape. The center rail insert 30 is fitted into the hollow space 21 of the composite rail 20. Of course, the center rail insert 30 must be oriented such that the bolt hole 33 formed in the web 31 faces the outside of the sandwich panel (refer to FIG. 6). Preferably, the center rail insert 30 is made of aluminum, which is light and has comparatively high strength. In addition, it is preferable that the center rail insert 30 be firmly attached in the hollow space 21 of the composite rail 20 by an epoxy adhesive.

The U-shaped side rail insert 50 is fitted into each of the opposite ends of the hollow space 21 and is connected to the adjacent sandwich panel 100 by bolting.

Figure 4:
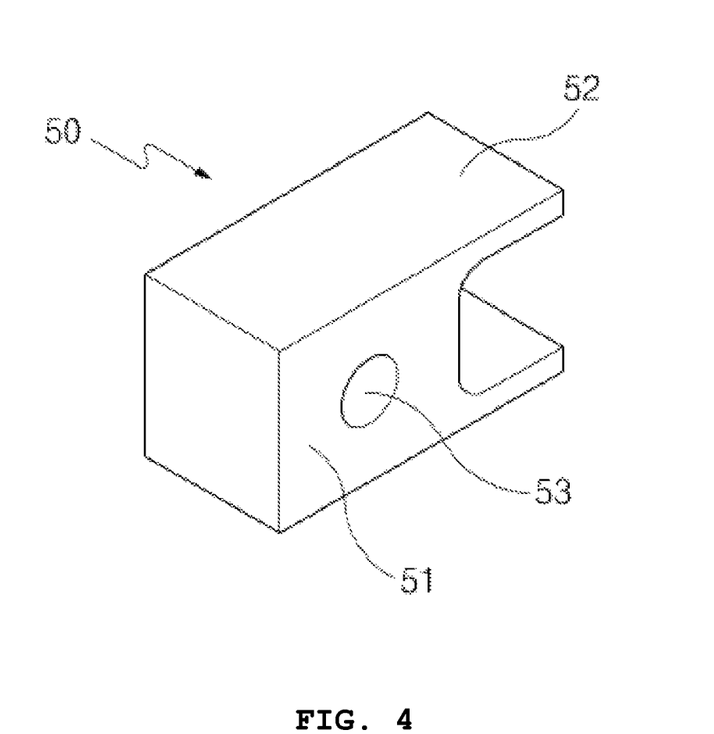
FIG. 4 is a perspective view of a side rail insert used in the present invention.

FIG. 4 is a perspective view of the side rail insert used in the present invention. As shown in FIG. 4, the U-shaped side rail insert 50 includes a web 51 which is placed upright, and flanges 52 which protrude from the opposite ends of the web 51 outwards in one direction. A bolt hole 53 is formed in a central portion of the web 51 so that the U-shaped side rail insert 50 can be coupled to an adjacent sandwich panel through the bolt hole 53 by bolting.

Due to the construction of the web 51 and the flanges 52, the side rail insert 50 generally has a U shape. The side rail inserts 50 are fitted into the respective opposite ends of the hollow space 21 of the composite rail 20 in such a way that the webs 51 of the side rail inserts 50 are oriented towards the corresponding opposite ends of the hollow space 21. Of course, each side rail insert 50 must be oriented such that the bolt hole 53 formed in the web 51 faces the outside of the sandwich panel (refer to FIG. 6). In addition, the side rail inserts 50 are preferably made of aluminum, which is light and has comparatively high strength. It is preferable that each side rail insert 50 be firmly attached in the hollow space 21 of the composite rail 20 by an epoxy adhesive.

As such, in the case where the sandwich panel is configured in such a way that each composite rail 20 has the hollow space 21 and the center rail insert 30 or the side rail insert 50 is fitted into the hollow space 21, even if the sandwich panel is subjected to extreme temperature changes, deformation of the structure that may result from a difference in coefficient of thermal expansion can be minimized because a contact surface area between the composite rail 20 and the aluminum inserts 30 and 50 is comparatively small. Moreover, a process of joining the composite sandwich panels with each other using the I-shaped center rail inserts or the U-shaped side rail inserts is simpler than the conventional joining process using the separate ribs. In addition, compared to the conventional technique, the strength of the composite sandwich panel is increased, while the weight thereof is reduced. Further, the present invention can prevent formation of unusable space which has formed attributable to the use of the separate ribs in the conventional technique.

The laminated composite skins 40 are planar members which cover upper and lower surfaces of the honeycomb core 10 that is enclosed by the composite rails 20. The laminated composite skins 40 refer to skins of the sandwich panel of the present invention.

Figure 6:
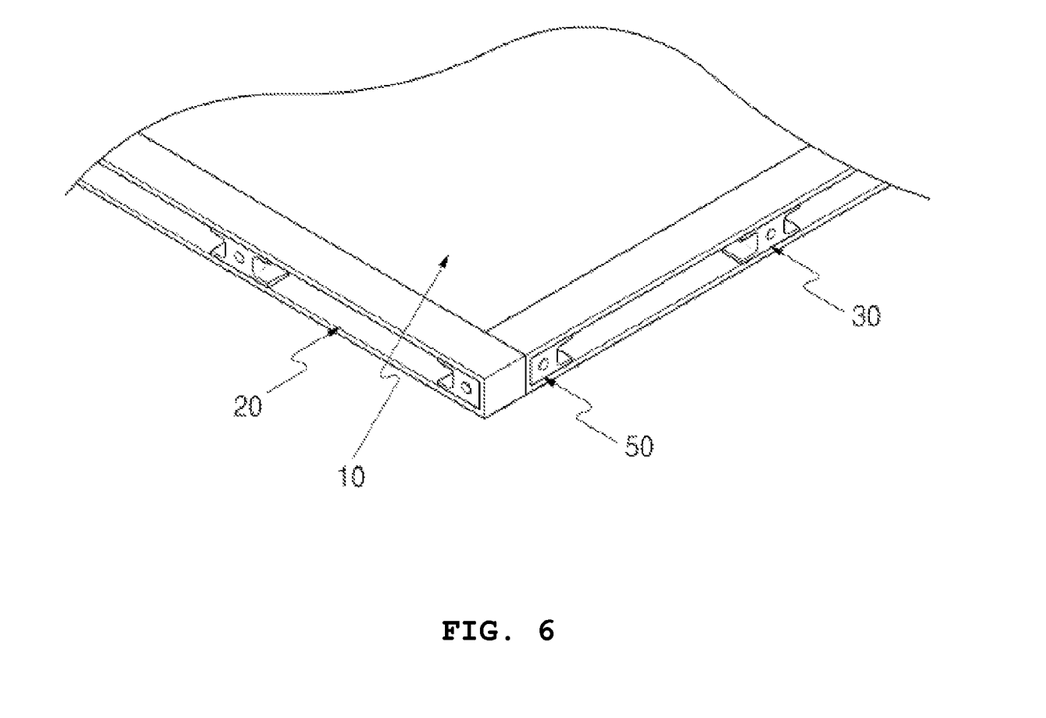
FIG. 6 is a perspective view showing the connection among the honeycomb core, the composite rails and the rail inserts according to the present invention.

FIG. 6 is a perspective view showing the connection among the honeycomb core, the composite rails and the rail inserts according to the present invention. As shown in FIG. 6, preferably, the adhesive films 60 are used to bond the laminated composite skins 40 which are outermost layers to the aluminum honeycomb core 10 and the composite rails 20. In other words, each adhesive film 60 functions to bond the corresponding laminated composite skin 40 to the aluminum central honeycomb core 10 and the composite rails 20. For this, a method of sealing the sandwich panel using a vacuum pack, heating it at high temperature, and then hardening it is typically used.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A composite honeycomb sandwich panel, comprising:
a planar honeycomb core;
a composite rail wrapped around a periphery of the honeycomb core, the composite rail having therein a hollow space that is open on opposite sides thereof;
an I-shaped center rail insert fitted into the hollow space of the composite rail so that the sandwich panel is connected to an adjacent sandwich panel by bolting through the I-shaped center rail insert; and
laminated composite skins covering upper and lower surfaces of the honeycomb core having the composite rail wrapped around,
wherein the composite rail comprises:
an upper rail and a lower rail provided parallel to each other at positions spaced apart from each other by a predetermined distance; and
spacers provided between opposite ends of the upper and lower rails.

2. The composite honeycomb sandwich panel according to claim 1, further comprising
a U-shaped side rail insert fitted into each of opposite ends of the hollow space so that the sandwich panel is connected to the adjacent sandwich panel by bolting through the U-shaped side rail insert.

3. The composite honeycomb sandwich panel according to claim 2, wherein the U-shaped side rail insert comprises:
a web placed upright; and
flanges protruding from opposite ends of the web outwards in one direction,
wherein a bolt hole is formed in a central portion of the web.

4. The composite honeycomb sandwich panel according to claim 3, wherein the center rail insert or the side rail insert is attached in the hollow space of the composite rail by an epoxy adhesive.

5. The composite honeycomb sandwich panel according to claim 3, wherein the honeycomb core, the center rail insert and the side rail insert are made of aluminum.

6. The composite honeycomb sandwich panel according to claim 2, wherein the center rail insert or the side rail insert is attached in the hollow space of the composite rail by an epoxy adhesive.

7. The composite honeycomb sandwich panel according to claim 2, wherein the honeycomb core, the center rail insert and the side rail insert are made of aluminum.

8. The composite honeycomb sandwich panel according to claim 1, wherein the I-shaped center rail insert comprises:
a web placed upright; and
flanges protruding from respective opposite ends of the web outwards in opposite directions,
wherein a bolt hole is formed in a central portion of the web.

9. The composite honeycomb sandwich panel according to claim 8, wherein the center rail insert is attached in the hollow space of the composite rail by an epoxy adhesive.

10. The composite honeycomb sandwich panel according to claim 8, wherein the honeycomb core and the center rail insert are made of aluminum.

11. The composite honeycomb sandwich panel according to claim 1, wherein an adhesive film is interposed between the honeycomb core having the composite rail wrapped around and each of the laminated composite skins to bond the laminated composite skin to the honeycomb core.

12. The composite honeycomb sandwich panel according to claim 11, wherein the center rail insert is attached in the hollow space of the composite rail by an epoxy adhesive.

13. The composite honeycomb sandwich panel according to claim 11, wherein the honeycomb core and the center rail insert are made of aluminum.

14. The composite honeycomb sandwich panel according to claim 1, wherein the center rail insert or the side rail insert is attached in the hollow space of the composite rail by an epoxy adhesive.

15. The composite honeycomb sandwich panel according to claim 1, wherein the honeycomb core and the center rail insert are made of aluminum.

16. The composite honeycomb sandwich panel according to claim 1, wherein the center rail insert is attached in the hollow space of the composite rail by an epoxy adhesive.

17. The composite honeycomb sandwich panel according to claim 1, wherein the honeycomb core and the center rail insert are made of aluminum.

* * * * *